United States Patent
Hanson (10) Patent No.: US 6,911,803 B2
(45) Date of Patent: Jun. 28, 2005

(54) SYSTEMS AND METHODS FOR EVALUATING A CHARGE STATE OF A BATTERY BASED ON OPTICAL PROPERTIES OF THE BATTERY ELECTROLYTE MATERIAL

(75) Inventor: George Hanson, Andover, KS (US)

(73) Assignee: LSI Logic Corporation, Milpitas, CA (US)

( * ) Notice: Subject to any disclaimer, the term of this patent is extended or adjusted under 35 U.S.C. 154(b) by 183 days.

(21) Appl. No.: 10/608,707

(22) Filed: Jun. 27, 2003

(65) Prior Publication Data

US 2004/0263126 A1 Dec. 30, 2004

(51) Int. Cl.$^7$ .................. H01M 10/44; H01M 10/46
(52) U.S. Cl. ........................................ 320/132
(58) Field of Search ............... 320/106, 112, 320/132, 149

(56) References Cited

U.S. PATENT DOCUMENTS

| | | | | |
|---|---|---|---|---|
| 4,320,291 A | * | 3/1982 | Uramoto | 250/227.11 |
| 4,350,885 A | * | 9/1982 | Patis | 250/231.1 |
| 4,366,431 A | * | 12/1982 | Santini | 320/147 |
| 4,433,913 A | * | 2/1984 | Harmer | 356/133 |
| 5,073,024 A | * | 12/1991 | Valette et al. | 356/481 |
| 6,121,755 A | * | 9/2000 | Nowak et al. | 320/132 |

* cited by examiner

Primary Examiner—Edward H. Tso
(74) Attorney, Agent, or Firm—Duft, Bornsen & Fishman (57) ABSTRACT

System and methods for evaluating a charge state of a battery are provided. A light source is configured for emitting light through an electrolyte contained within the battery. An optical element determines the charge state based on the light passing through the electrolyte. The optical element may comprise an optical sensor such as a CCD. Such a CCD may be used to determine the location of light impinging the surface of the CCD. In one embodiment, the system includes a processor for determining the index of refraction for the electrolyte based on the location where refracted light impinges a CCD. From that index of refraction, a specific gravity of the electrolyte may be calculated to determine the charge state of the battery.

18 Claims, 8 Drawing Sheets

SYSTEMS AND METHODS FOR EVALUATING A CHARGE STATE OF A BATTERY BASED ON OPTICAL PROPERTIES OF THE BATTERY ELECTROLYTE MATERIAL

BACKGROUND OF THE INVENTION

1. Field of the Invention

The invention generally relates to determining a charge state of a battery. More specifically, the present invention relates to determining a residual capacity of the battery using optical structures and methods. Such a determination may include a substantially instantaneous quantitative analysis of electrolyte properties within the battery, synonymous with the charge state of the battery.

2. Discussion of Related Art

Rechargeable batteries create electrical current for an externally connected electrical circuit by means of a reversible chemical reaction with an electrolyte in the battery. For example, a lead acid battery, such as a typical car battery, is known to contain water-diluted sulfuric acid as an electrolyte that chemically reacts with lead electrodes of the battery to provide electrical current for the circuit. The chemical reaction within the battery is an oxidation/reduction chemical reaction that creates the electrical current. Typically, the oxidation takes place at one electrode of the battery and the reduction takes place at another electrode of the battery.

The positive electrode of the battery is formed on a plate of lead dioxide ($PbO_2$) which forms lead sulfate ($PbSO_4$) on the plate when in contact with the water-diluted sulfuric acid ($2H_2SO_4$). This oxidation chemical reaction forces the positive plate to expel, or supply, electrons during this reaction, leaving the plate with a positive charge. Similarly, the negative electrode is formed on a plate composed of lead (Pb) that also creates lead sulfate when chemically reacting with the sulfuric acid. The negative plate, however, is forced to expel, or supply, positive ions during this reduction reaction, leaving the plate with a negative charge. Thus the overall chemical reaction between the electrolyte and the two electrode plates can be written as $PbO_2 + Pb + 2H_2SO_4 = 2H_2O + 2PbSO_4$. Relating this equation to charge states of the battery, $PbO_2 + Pb + 2H_2SO_4$ is synonymous with a charged battery and $2H_2O + 2PbSO_4$ is synonymous with a discharged battery.

The chemical reactions of the positive and negative plates provide electrical current when the electrodes are connected to one another, such as with an application-specific electrical circuit. Once discharged, the battery is recharged for application reuse. This recharging of the battery reverses the above-mentioned chemical reaction. Similarly, when the electrolyte level does not completely submerge the plates, more electrolyte is added such that the battery may continue to properly provide electrical-current producing chemical reactions for specific applications.

The life of the battery (e.g., it's ability to properly provide these chemical reactions) depends on the battery's ability to reverse the above-mentioned chemical reaction. This ability is damaged over time, for example, when the electrolyte level is often at levels that do not completely submerge the plates or through progressive low level chemical reactions of the electrolyte with the plates, thereby causing "lead sulfation." Lead sulfation is the chemical process in which lead sulfate crystallizes on the electrodes. The crystallization permanently damages the battery because sulfur can no longer be converted into sulfuric acid through recharging. Accordingly, an attempt to recharge a lead sulfated battery will produce no resident charge in the battery.

Prior systems attempted to address the issue of physical decreases of electrolyte levels by using optical elements. For example, the physical level of a particular electrolyte could be determined by how light was refracted through the electrolyte using a visual electrolyte level indicator. These indicators took advantage of the fact that the index of refraction of the electrolyte, regardless of electrolyte concentration, differed from that of the optical elements used. Such a visual indicator reflected light illuminating the bottom of the indicator differently based on whether the indicator was surrounded by air or liquid. From this differing reflection, one could determine when to add more electrolyte.

While these prior systems were effective at determining an amount of electrolyte within a battery, the systems did nothing to determine a charge state of the battery. However, other prior systems have been developed that do measure the charge state of the battery. These other prior systems typically exist as circuits that connect to the electrodes of the battery and measure the charge state of the battery by measuring the voltage of the battery. Such systems, while determining a charge state, actually drain the battery of electrical charge because these systems, in effect, place a charge-draining load on the battery, a process known as "load testing." For example, in load testing, a relatively large load is applied to the battery and terminal voltage is monitored as the cells within the battery discharge. This type of charge state determination is inherently inaccurate because while the charge state is evaluated the capacity of the battery is concurrently reduced.

Still other prior systems, such as those produced by Benchmarq Microelectronics, Inc., seek to evaluate the charge state of the battery by determining how the battery accepts a charge. These "charge acceptance" systems monitor electrical current between a charger and a battery as the charger recharges the battery. Since batteries cannot be instantaneously charged, such charge acceptance systems cannot make substantially instantaneous determinations of charge states in the battery but rather determine charge acceptance over a period of time. Moreover, these systems also intrusively evaluate the charge state because they monitor the charge as it is accepted by the battery.

While some prior systems discussed herein can determine a quantity of electrolyte within a battery, none of the prior systems can determine a charge state of the battery without altering the charge state of the battery and/or impacting the life of the battery. Accordingly, it is evident that a need exists for improved methods and structures for determining charge states of batteries. Although discussed herein with respect to lead acid batteries, these problems are not specific to lead acid batteries per se as they may arise in any battery, particularly those batteries containing translucent electrolytes, such as liquid electrolytes and gel electrolytes.

SUMMARY OF THE INVENTION

The present invention solves the above and other problems, thereby advancing the state of useful arts, by providing methods and associated structures for evaluating a charge state of a battery. More specifically, a system evaluates the residual capacity of the battery by emitting light through an electrolyte within the battery. An optical element senses the light and determines an index of refraction for the electrolyte as the light interacts with the electrolyte. Based on the measured index of refraction, a specific gravity for the particular electrolyte under examination is determined and, thus, a residual charge capacity of the battery is ascertained. The electrolyte is not physically disturbed by this test nor is the charge state of the battery. The system is capable of determining a substantially real-time charge state of the battery in a non-intrusive manner. As used herein, real-time refers to instantaneous determinations exclusive of any delays caused by detection circuitry (e.g., such circuitry delays are typically on the order of microseconds).

In another embodiment, the specific gravity may be determined from a table look-up to ascertain the charge state directly from the index of refraction. For example, since the relationship between the index of refraction and the specific gravity for a particular electrolyte may be predetermined, the charge state may be directly determined from the index of refraction through the use of a look-up table corresponding to the predetermined relationship.

In one exemplary embodiment of the invention, a system for evaluating a charge state of a battery comprises: a light source configured for emitting light through an electrolyte within the battery; and an optical element configured for determining the charge state based on the light passing through the electrolyte.

In another exemplary embodiment of the invention, the electrolyte is at least one of a liquid and a gel.

In another exemplary embodiment of the invention, the liquid comprises sulfuric acid.

In another exemplary embodiment of the invention, the electrolyte is encapsulated within cells of the battery and wherein the battery is a lead-acid battery.

In another exemplary embodiment of the invention, the system further comprises an optical barrier configured for preventing the light from directly traveling from the light source to the optical element.

In another exemplary embodiment of the invention, the light source comprises a light emitting diode.

In another exemplary embodiment of the invention, the light source comprises a shutter configured for discretely emitting the light from the light source.

In another exemplary embodiment of the invention, the optical element comprises a light sensor configured for receiving the light passing through the electrolyte.

In another exemplary embodiment of the invention, the light sensor is a charged coupled device configured for receiving the light at a particular location of the charged coupled device.

In another exemplary embodiment of the invention, the system further comprises a processor configured for determining the charge state based on the particular location of the light impinging the charge coupled device.

In another exemplary embodiment of the invention, the system further comprises a processor configured for determining the charge state based on a specific gravity of the electrolyte and an index of refraction of the electrolyte.

In another exemplary embodiment of the invention, the processor is further configured for generating a least mean squares approximation of the index of refraction with respect to the specific gravity.

In another exemplary embodiment of the invention, the system further comprises a mirrored surface configured for reflecting the light to the optical element based on a predetermined evaluation of the index of refraction of the electrolyte, wherein reflected light is used to determine the charge state.

In one exemplary embodiment of the invention, a system for evaluating a charge state of a battery comprises: a light source; and a charge detector in communication with the light source and configured for determining the charge state in real-time.

In another exemplary embodiment of the invention, the battery comprises an electrolyte that is at least one of a liquid and a gel.

In another exemplary embodiment of the invention, the light source comprises a light emitting diode.

In another exemplary embodiment of the invention, the light source comprises a shutter configured for discretely emitting the light from the light source.

In another exemplary embodiment of the invention, the charge detector comprises a light sensor configured for receiving the light passing through an electrolyte within the battery.

In another exemplary embodiment of the invention, the light sensor is a charged coupled device configured for receiving the light at a particular location of the charged coupled device.

In another exemplary embodiment of the invention, the system further comprises a processor configured for determining the charge state based on a specific gravity of an electrolyte within the battery and an index of refraction of the electrolyte as determined by the particular location of the light impinging the charge coupled device.

In one exemplary embodiment of the invention, a method of evaluating a charge state of a battery comprises steps of: directing light through an electrolyte within the battery; and determining a value of the charge state based on the light passing through the electrolyte.

In another exemplary embodiment of the invention, the step of directing comprises a step of emitting the light.

In another exemplary embodiment of the invention, the step of directing comprises a step of shuttering the light.

In another exemplary embodiment of the invention, the step of determining comprises a step of detecting the light at a particular location to determine an index of refraction of the electrolyte.

In another exemplary embodiment of the invention, the step of determining further comprises a step of determining the value of the charge state based on the index of refraction of the electrolyte and an associated a specific gravity of the electrolyte.

In one exemplary embodiment of the invention, a system for evaluating a charge state of a battery comprises: a light source; and a charge detector in communication with the light source and configured for non-intrusively determining the charge state.

In one exemplary embodiment of the invention, a system for evaluating a charge state of a battery comprises: a light source configured for emitting light; and an optical element, responsive to the light, configured for determining the charge state based on optical properties of an electrolyte within the battery.

DETAILED DESCRIPTION OF THE DRAWINGS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents and alternatives falling within the spirit and scope of the invention as defined by the appended claims.

Figure 1:
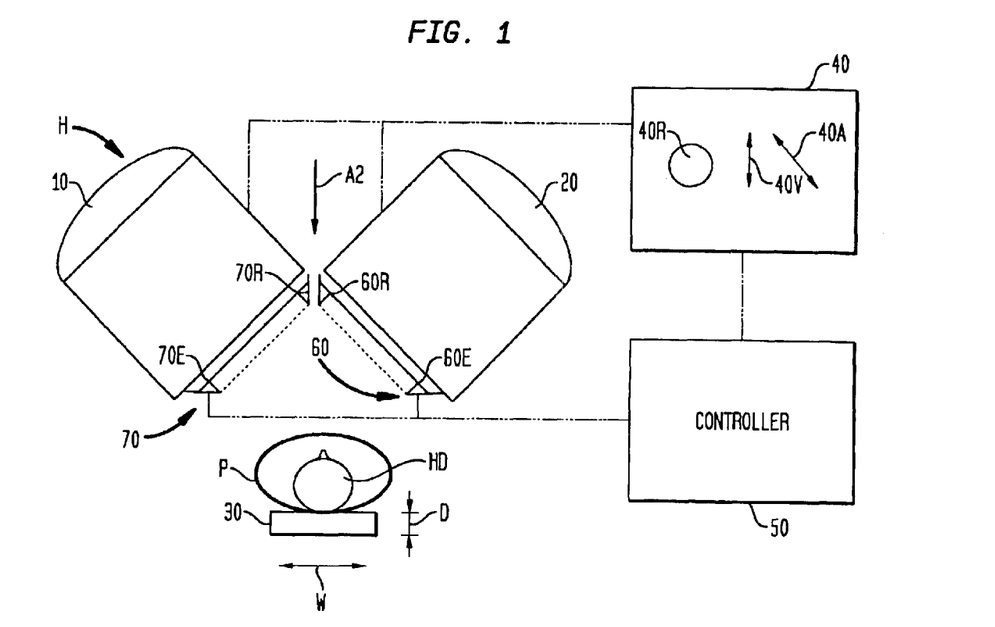
FIG. 1 is a block diagram of a system for evaluating a charge state of a battery in an exemplary embodiment of the invention.

With reference now to the figures and in particular with reference to FIG. 1, an exemplary embodiment of the invention is shown in system 100. System 100 is configured for evaluating a charge state of a battery 102 containing electrolyte 105. Electrode plates in the battery 102 are not shown in FIG. 1 but are known to those skilled in the art. Examples of such an electrolyte include water-diluted sulfuric acid as found in a lead acid battery. In this embodiment, charge state of battery 102 is determined based on light 104 passing through the electrolyte. Thus, in this particular embodiment, electrolyte 105 is translucent. For example, light 104 may refract at refractive interface 106 with electrolyte 105 at different angles. Each angle may correspond to an index of refraction for a particular specific gravity of electrolyte (e.g., various angles are shown with light 104). This index of refraction may be used to determine the specific gravity of electrolyte 105 and to subsequently determine the charge state of battery 102.

The specific gravity is a measure of density of a material as compared to the density of water (e.g., specific gravity of water is 1.0). Accordingly, as battery 102 discharges, the density of electrolyte 105 decreases from the above mentioned chemical reaction. Thus, specific gravity of the electrolyte 105 decreases because acid concentration decreases in the electrolyte. Since denser materials typically have greater indices of refraction and therefore cause light to refract at greater angles, the specific gravity of electrolyte 105 can be ascertained by determining the index of refraction of the electrolyte 105. Since the charge state of a battery corresponds to the specific gravity of electrolyte 105, the charge state of battery 102 can be determined, in essence, from the index of refraction of the electrolyte 105.

To emit and to detect light 104, system 100 includes light directing means 101 and optical sensor 103. Light directing means 101 may be externally powered and is configured for emitting and/or directing light toward refractive interface 106 such that light refracts as it passes through interface 106 into electrolyte 105. For example, light directing means 101 may be a diode laser which emits and directs light as a collimated beam. In other embodiments, light 104 may be directed using a pin-hole aperture such that light is emitted through the aperture generally forming a beam or a ray. In still other embodiments as discussed further below, light 104 may be focused by reflectors or other optical means to generally form a beam or ray directed at sensor 103. Still further, light directing means 101 may emit light continuously or may pulse the light when a measurement is required. As used herein, reference to "light" or "beam" or "ray" should be understood to mean any light source whether collimated or not, whether continuous or intermittent, whether directed through an aperture or not, etc. In essence, light is any source of illumination that may be used as discussed herein to determine the charge state of battery 102.

Optical sensor 103 may be externally powered and configured for detecting light 104 passing through electrolyte 105. Optical sensor 103 may include, for example, a charge coupled device (CCD) that indicates a location in which light impinges the CCD. As such, information derived from the CCD may be used to determine the index of refraction for electrolyte 105 from the location at which the beam strikes the CCD since the initial direction of propagation for light 104 can be predetermined. For example, light directing means 101 may be configured in such a way as to produce a collimated beam of light intentionally directed at a predetermined angle through refractive interface 106. The beam of light refracts as it passes through the interface 106 into electrolyte 105 because of the different index of refraction in the two media. The system 100 may sense the altered location of the light impinging upon the CCD (optical sensor 103). Such a refractive shift in location may be used to determine the index of refraction for electrolyte 105. The index of refraction may then be used to determine various charge states of battery 102, such as a fully charged state and completely discharged state. Therefore, optical sensor 103 may function as charge state detector for battery 102. Optical sensor 103 may detect the presence or absence of light incident upon it and therefore may determine as a binary test whether the battery 102 is above or below a threshold charge state. In addition, optical sensor 103 may detect a degree of refraction sensing the position of the refracted beam or ray relative to its initial direction. Thus the system may generate a signal proportional to the charge state of battery 102 within a desired range. Still further, the optical sensor 103 may determine an amplitude of the refracted light incident thereon as a larger or smaller portion of a non-collimated beam strikes the sensor. The amplitude of such a signal may be proportional to the degree of refraction and hence to the charge state properties of battery 102.

This embodiment is not intended to be limited to the various types of batteries discussed herein. Rather, system 100 may be configured to evaluate the charge state of other types of batteries as well. Other batteries may contain electrolytes that are liquid electrolytes and/or gel electrolytes. For example, a translucent gel electrolyte in a battery cell may refract light in such a way that the combination of the index of refraction for the gel and the specific gravity of the gel may be used to determine a charge state of the battery. Exemplary details of refraction/specific gravity calculations are discussed in the figures below.

Figure 2:
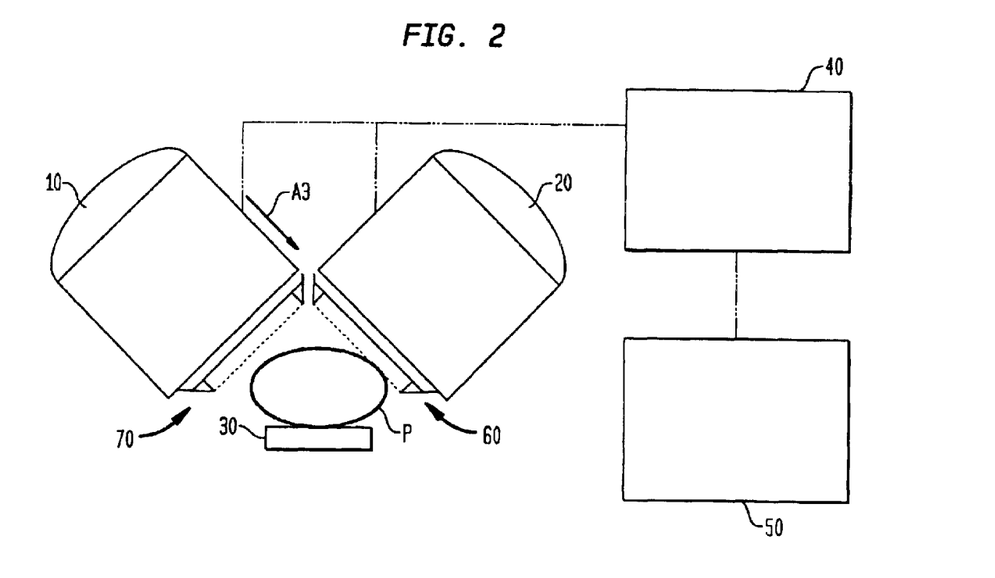
FIG. 2 is a block diagram of a system for evaluating a charge state of a battery in another exemplary embodiment of the invention.

FIG. 2 illustrates a block diagram of system 200 configured for evaluating a charge level of a battery containing electrolyte 205 in another exemplary embodiment of the invention. Electrolyte 205 is contained within a battery structure (not shown). Such a battery structure includes electrode plates (not shown) as known in the art. System 200 is therefore mounted appropriately such that the system is immersed within electrolyte 205 as required to perform the desired measurement of charge state of the battery.

In this embodiment, the charge state of the battery is optically determined based on indices of refraction for various concentrations of electrolyte 205. System 200 includes LED 201 encapsulated in pin-hole shroud 211 and connected to circuit board 209. LED 201 is configured to emit light for transmission through optical medium 220 and into electrolyte 205. Pin-hole shroud 211 is configured for substantially collimating the light from LED 210 into a more concentrated beam. Optionally, a physical shutter, such as that used in a typical camera, may be used in place of or in conjunction with pin hole shroud 211 to discretely emit light into electrolyte 205. In like manner, the light may be electronically pulsed to discretely emit light into the electrolyte 205. Optical medium 220 may comprise a material, such as glass or various plastics, having refractive properties that differ from those of electrolyte 205. Such as material may also be comprised of material that is resistive to corrosive properties of electrolyte 205.

System 200 also includes optical sensor 203 which is configured for detecting the collimated light from LED 201. While an LED is shown in this exemplary embodiment, other means for directing and/or generating light may fall within the scope of the invention. Accordingly, the invention is not intended to be limited to LEDs of the exemplary embodiment.

When the battery is in a fully charged state, electrolyte 205 is denser than when the battery is discharged, particularly because there is no electrical current providing chemical reaction with the positive/negative electrodes and the electrolyte. For example, when a lead acid battery is fully charged and there is no conductor for discharge (e.g., no complete circuit between the positive and negative electrodes of the battery), there is no lead sulfation chemical reaction of the electrodes to provide electrical current. Thus, the sulfur portion of the sulfuric acid electrolyte is forced to remain in the electrolyte, keeping the electrolyte denser than when there is electrical discharge. Alternatively, when a battery is fully discharged, the electrolyte is thinner, or less dense, as there no longer is a chemical reaction reducing electrolyte 205 to higher concentration of water.

When the battery is fully charged, electrolyte 205 contains a known amount of sulfuric acid and, thus, a known specific gravity. For example, the specific gravity of the sulfuric acid is calculated as the density of the known amount of the acid with respect to the density of the known amount of water. In this example, an index of refraction for the sulfuric acid can be determined based on its specific gravity. Many tables exist, such as the CRC Handbook of Chemistry and Physics, 83$^{rd}$ edition, CRC Press LLC (2000), that list indices of refraction corresponding to specific gravities for known materials. For example, sulfuric acid in a typical lead acid battery has a specific gravity of about 1.285 when fully charged and about 1.130 when fully discharged.

Each of these specific gravities for sulfuric acid has an associated index of refraction locatable in the above mentioned CRC Handbook. For example, sulfuric acid with a concentration having a specific gravity of 1.265 has an index of refraction of about 1.3551 while a concentration having a specific gravity of 1.2878 has an index of refraction of about 1.3797. Based on these known quantities, a user can determine the charge state of a battery from light refracted in electrolyte 205. One approach used to determine the charge state from such refractive properties is discussed further herein below.

Using these known properties of optical refraction, the system 200 may determine the charge state using refractive interface 207 and mirrored surface 208—both representing surfaces of the optical medium 220. Refractive interface 207 is positioned at an angle $A_1$ of such magnitude with respect to horizontal 212 as to either reflect or refract light from LED 201 based on the indices of refraction of electrolyte 205 and optical medium 220 where they join at refractive interface 207. For example, Snell's law determines the angle incident with interface 207 for which light will either be refracted to pass through the interface 207 or reflected off the interface based on the indices of the refraction for electrolyte 205 and for interface 207. Refraction and reflection according to Snell's law are explained in greater detail in FIGS. 6 and 7. As used herein, an incident angle is an angle having a magnitude from normal of an interface, such as that shown in line 210 as normal to mirrored surface 208.

When light is refracted so as to pass through interface 207, no light is detected by optical sensor 203. In this state, electrolyte 205 has refractive properties associated with a fully charged electrolyte because the electrolyte is denser (e.g., has a larger specific gravity and thus a greater index of refraction). However, when the battery is fully discharged, the electrolyte 205 is less dense and has a lower index of refraction. Accordingly, the light from LED 201 is reflected off interface 207 at an angle having the same magnitude as the incident angle. Once reflected, the light impinges mirrored surface 208 at an angle incident with the mirrored surface and accordingly reflects the light at an angle having the magnitude of the angle incident with the mirrored surface. In this embodiment, mirrored surface 208 is positioned at an angle $A_2$ from horizontal 212 that compliments angle $A_1$. For example, system 200 is illustrated such that light from LED 201 reflects off interface 207 to mirrored surface 208, assuming the refractive index for electrolyte 205 is small enough. The light then reflects to sensor 203 for a determination that the charge state of the battery is fully discharged.

In this embodiment, system 200 illustrates the use of light in a substantially collimated beam, such as that produced by a laser. In such an embodiment, light may either totally reflect or totally refract depending on, among other things, index of refraction for electrolyte 205. Accordingly, optical sensor 203 may receive substantially all or none of the light from LED 201 to make such a binary-like determination of charge state as described herein. However, those skilled in the art will recognize that other means for transmitting light may be used and that such light may not be as collimated as described. Accordingly, in embodiments where cost is of a concern, other less-collimating light sources may be used that cause some light to be partially reflected at interface 207, partially refracted at interface 207 and/or partially dispersed by the optical medium 220. In such an embodiment, optical sensor 203 may determine charge state with respect to a reference signal representing a predetermined level of received light. Additionally, system 200 also includes optical barrier 206 configured with optical medium 220 for baffling or blocking all direct light between LED 201 and optical sensor 203 to substantially ensure that light from LED 201 does not travel directly to sensor 203 (i.e., without reflection). Such a barrier 206 may assist in charge state determinations by preventing detection of stray light caused by optical effects such as dispersion.

In this particular embodiment, angle $A_1$ has a magnitude of about 60.4° from horizontal (represented by horizontal line 212) and angle $A_2$ has a magnitude of about 29.6° from horizontal. However, this embodiment is not intended to be limited to the exemplary angles shown herein. Rather, other angles may be used as determined with respect to a particular electrolyte. Additionally, other embodiments may include sensors and light directing means that are positioned at other angles as a matter of design choice that fall within the scope of the invention. In particular, other angles may be chosen corresponding to other specific gravities and associated refractive properties of the electrolyte. The system may thus sense other charge states beside fully charged and fully discharged.

While discussed in great detail with respect to lead acid batteries and sulfuric acid as the electrolyte for said lead acid batteries, the invention is not intended to be limited to an electrolyte comprising only water diluted sulfuric acid. Rather, the invention discloses means for optically evaluating the charge state of a battery containing electrolytes. The sulfuric acid embodiments disclosed herein are only intended to be exemplary in nature discussed in detail to illustrate the optical charge state determinations with one common electrolyte. Accordingly, system 200 may be used to evaluate charge states of batteries having other electrolytes, particularly those electrolytes which are translucent.

Figure 3:
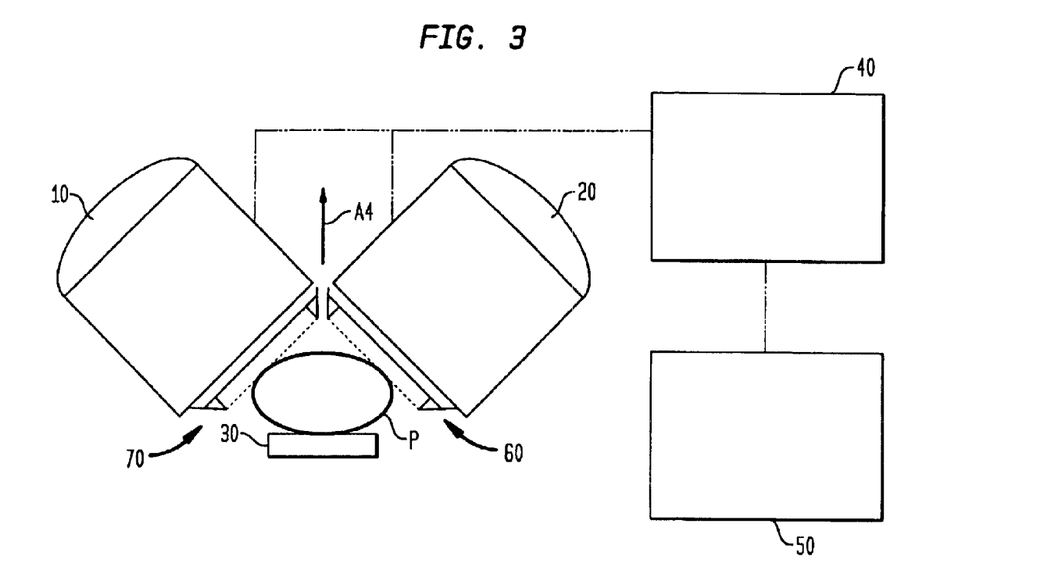
FIG. 3 is a graph illustrating specific gravities with respect to indices of refraction for an electrolyte.

FIG. 3 shows a graph illustrating specific gravities with respect to indices of refraction for an electrolyte having various concentrations of sulfuric acid. The sulfuric acid is exemplary of electrolyte 205 described in system 200. Table 1 shows increasing indices of refraction for various specific gravities of sulfuric acid, as found in the above mentioned CRC handbook.

TABLE 1

| Index of Refraction | Specific Gravity |
| --- | --- |
| 1.33299 | 1 |
| 1.3336 | 1.0034 |
| 1.3342 | 1.0067 |
| 1.3349 | 1.0101 |
| 1.3355 | 1.0134 |
| 1.3361 | 1.0168 |
| 1.3367 | 1.0201 |
| 1.3373 | 1.0235 |
| 1.3379 | 1.0269 |
| 1.3385 | 1.0302 |
| 1.3391 | 1.0336 |
| 1.3397 | 1.037 |
| 1.3403 | 1.0404 |
| 1.3409 | 1.0438 |
| 1.3415 | 1.0472 |
| 1.3421 | 1.0506 |
| 1.3427 | 1.0541 |
| 1.3433 | 1.0575 |
| 1.3439 | 1.061 |
| 1.3445 | 1.0645 |
| 1.3451 | 1.068 |
| 1.3463 | 1.075 |
| 1.3475 | 1.0821 |
| 1.3488 | 1.0893 |
| 1.35 | 1.0966 |
| 1.3513 | 1.1039 |
| 1.3525 | 1.1114 |
| 1.3538 | 1.1189 |
| 1.3551 | 1.1265 |
| 1.3563 | 1.1341 |
| 1.3576 | 1.1418 |
| 1.3602 | 1.1575 |
| 1.3628 | 1.1735 |

TABLE 1-continued

| Index of Refraction | Specific Gravity |
| --- | --- |
| 1.3653 | 1.1893 |
| 1.3677 | 1.2052 |
| 1.3701 | 1.2213 |
| 1.3725 | 1.2375 |
| 1.3749 | 1.254 |
| 1.3773 | 1.2707 |
| 1.3797 | 1.2878 |
| 1.3821 | 1.3051 |
| 1.3846 | 1.3229 |
| 1.387 | 1.341 |
| 1.3895 | 1.3594 |
| 1.392 | 1.3783 |
| 1.3945 | 1.3977 |
| 1.3971 | 1.4174 |
| 1.3997 | 1.4377 |
| 1.4024 | 1.4584 |
| 1.405 | 1.4796 |
| 1.4077 | 1.5013 |

From the plot of FIG. 3, charge state of the battery (e.g., a lead acid battery) can be determined based on detected indices of refraction because a particular index of refraction corresponds to a known specific gravity SPGR and because a particular charge level corresponds to a specific gravity as described above. As evident from FIG. 3, the curve that is visible from the plot of indices of refraction with respect to specific gravities is almost linear. Depending on a desired accuracy, one can interpolate the points as though they are substantially linear to determine other points, and thus determine a charge state, or one may fit a curve to the points to determine a polynomial equation for computing other points.

Figure 4:
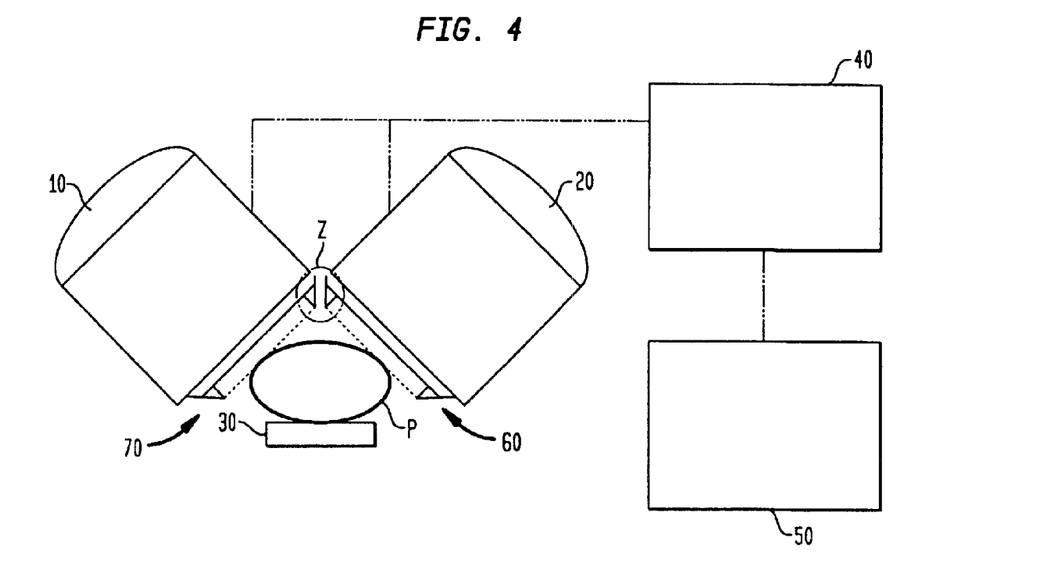
FIG. 4 is a graph illustrating a curve fit approximation of the plot of FIG. 3.

FIG. 4 shows a graph illustrating a curve fit approximation of the plot of FIG. 3. In this embodiment, a least mean squares algorithm was used to determine a $4^{th}$ order polynomial approximation of the points shown in FIG. 3. This least mean squares algorithm yielded an equation of $$y = -44.91861168x^4 + 161.0303468x^3 - 138.6614343x^2 - 58.02410738x + 85.14081892,$$

where x=index of refraction and y=specific gravity SPGR for the material. Accordingly, the specific gravity for this particular exemplary electrolyte can be determined based on the detected index of refraction. For example, since the total amount of sulfuric acid used to make a fully charged lead acid battery is known, the charge state of the battery can be determined from the least means squares approximated specific gravity of the acid.

Least mean squares algorithms are known to those skilled in the art. However, other algorithms may be used to approximate the relationships between specific gravities and indices of refraction for materials. Additionally, other polynomial approximations may be used to achieve differing accuracy, as a matter of design choice, than that which is provided. Still further, where the relationship of specific gravity to index of refraction is substantially linear, standard linear interpolation computations may be employed. To simplify implementation, as a matter of design choice, such a substantially linear relationship may be represented as a table of entries such that a simple table lookup for a value and interpolation between the two closest values in the table may be used to determine the index of refraction. Accordingly, the invention is not intended to be limited to the exemplary embodiments shown herein.

Figure 5:
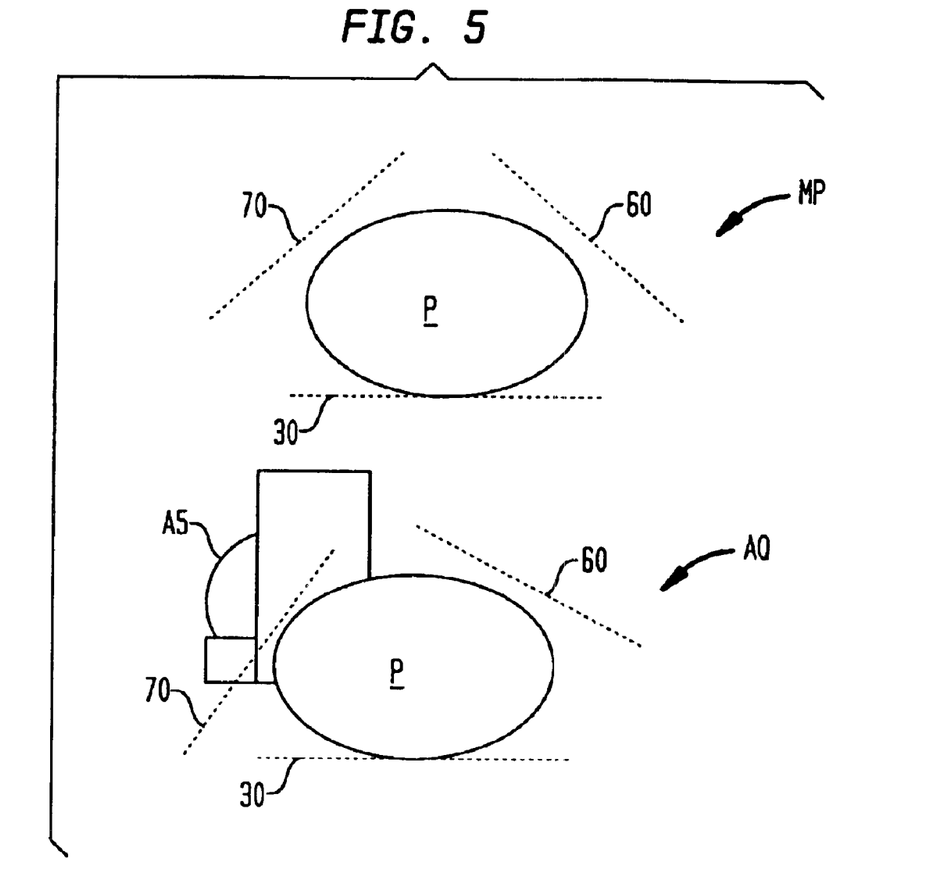
FIG. 5 is a graph illustrating specific gravities with respect to indices of refraction for an electrolyte in a lead acid battery.

FIG. 5 shows a graph illustrating specific gravities SPGR with respect to indices of refraction for an electrolyte in a lead acid battery. In this embodiment, the electrolyte includes levels of sulfuric acid as commonly found in a car battery. Such a car battery comprises sulfuric acid with a specific gravity of about 1.285 when fully charged and about 1.130 when fully discharged. Table 2 accordingly shows increasing indices of refraction for specific gravities of sulfuric acid within that range.

TABLE 2

| Index of Refraction | Specific Gravity |
|---|---|
| 1.3551 | 1.1265 |
| 1.3563 | 1.1341 |
| 1.3576 | 1.1418 |
| 1.3602 | 1.1575 |
| 1.3628 | 1.1735 |
| 1.3653 | 1.1893 |
| 1.3677 | 1.2052 |
| 1.3701 | 1.2213 |
| 1.3725 | 1.2375 |
| 1.3749 | 1.254 |
| 1.3773 | 1.2707 |
| 1.3797 | 1.2878 |

The curve fit, in this embodiment, is again calculated using the least mean squares algorithm, which yields $$y = 2.148852123x^4 + 1.998212487x^3 - 7.879122294x^2 5.089241392x + 10.27319648,$$

where x and y are again the index of refraction and specific gravity for the material, respectively. The specific gravity for the sulfuric acid of the typical car battery is then determined based on the detected index of refraction. Again, the concentration of sulfuric acid used to make a fully charged car battery is known, thus, the charge level of the battery can be determined from the least means squares approximated specific gravity of acid.

Figure 6:
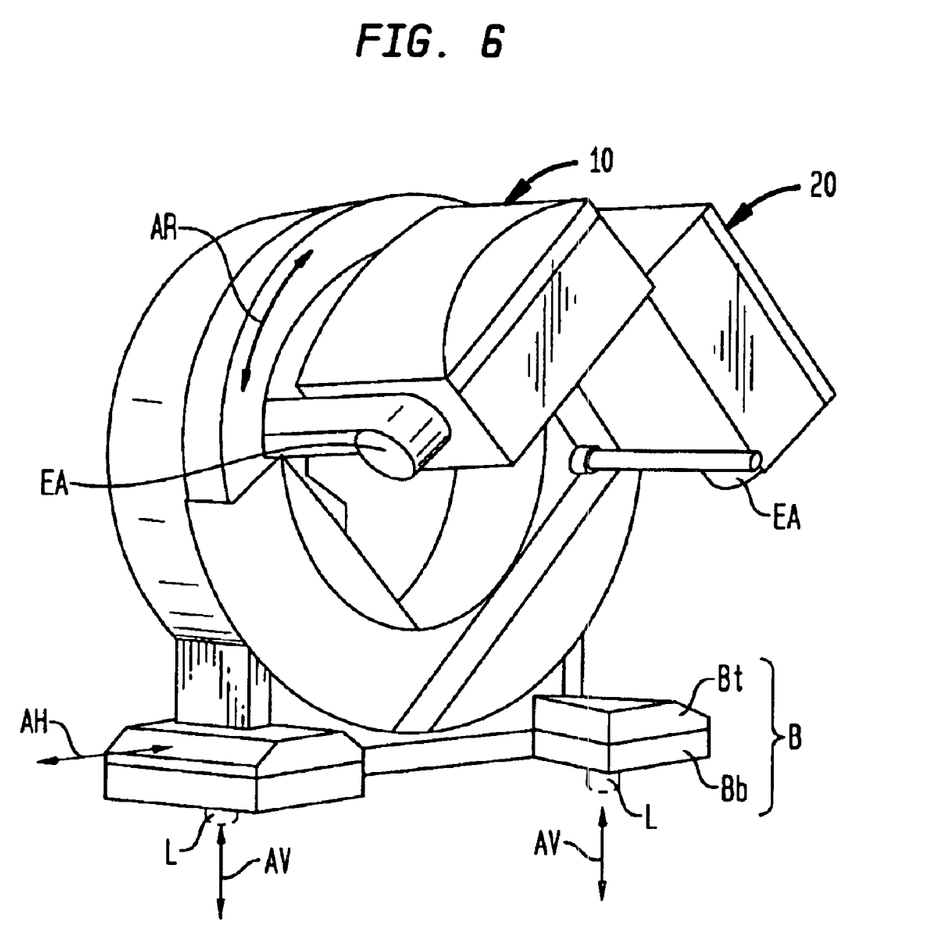
FIG. 6 illustrates refraction of light with an electrolyte.

FIG. 6 illustrates refraction of light 213 with electrolyte 205 of system 200. As shown in this embodiment, LED 201 directionally emits light 213 through optical medium 220 towards refractive interface 207. According to Snell's law, light 213 will either be reflected (discussed in FIG. 7) or refracted at an angle $?_2$ when light impinges interface 207 at a predetermined incident angle $?_1$ from normal 214 of interface 207. Snell's law is as follows:

$$n_1 \sin(?_1) = n_2 \sin(?_2), \text{ where} \quad (\text{Eq. 1})$$

$n_1$ is the known index of refraction for optical element 220 and $n_2$ is the variable constant index of refraction for electrolyte 205 (e.g., $n_2$ is variable because specific gravity of electrolyte 205 varies according to a varying charge state of the battery).

When the battery is fully charged, the electrolyte 205 has an index of refraction $n_2$ that causes the light 213 to refract at interface 207 because the density (e.g. specific gravity) of the electrolyte is greater than that of a fully discharged electrolyte. Since light 213 is refracted at interface 207, optical sensor 203 does not detect light 213 and a conclusion of full charge can thusly be determined. Other embodiments described in FIGS. 7 and 8 illustrate determinations of other charge states of the battery containing electrolyte 205, such as fully discharged in FIG. 7.

Figures 7A, 7B, 7C:
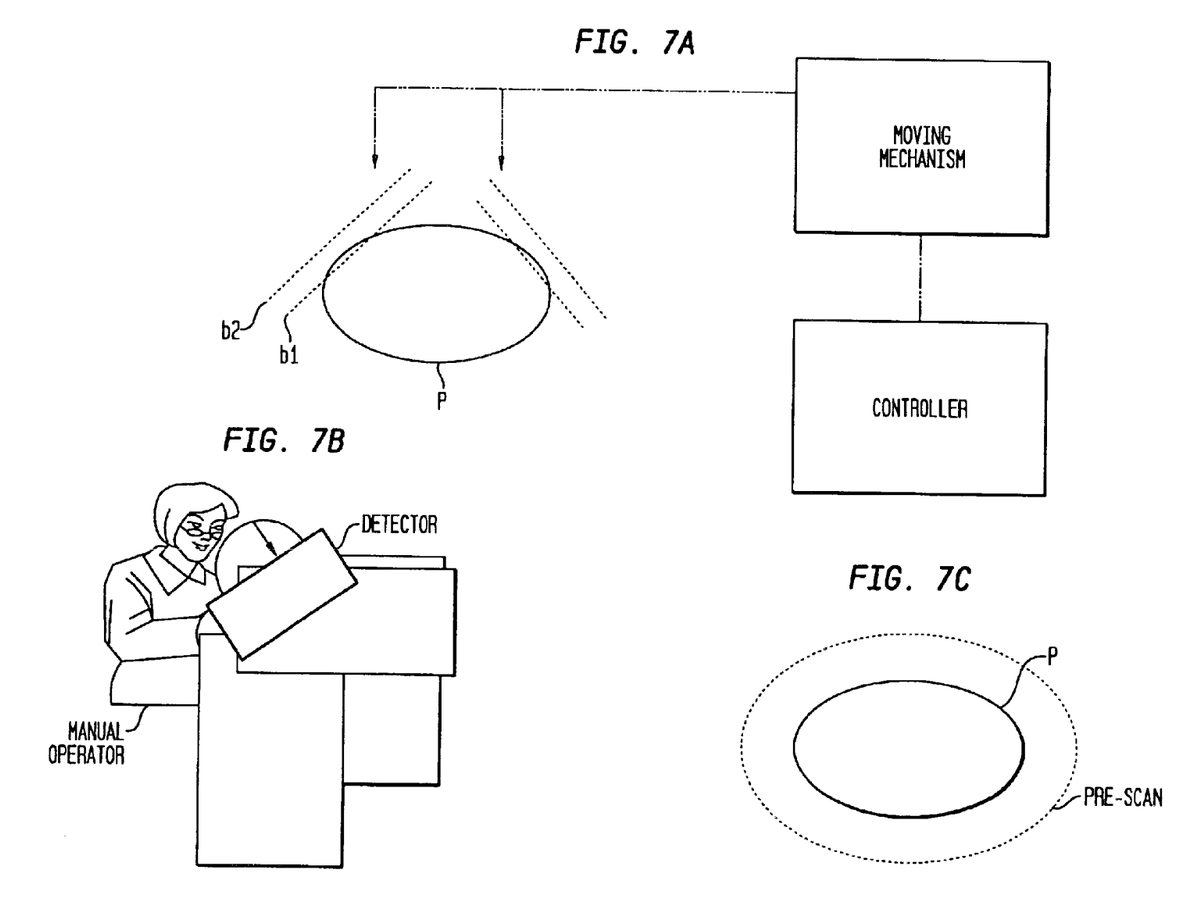
FIG. 7 illustrates reflection of light with the electrolyte.
Figure 8A:
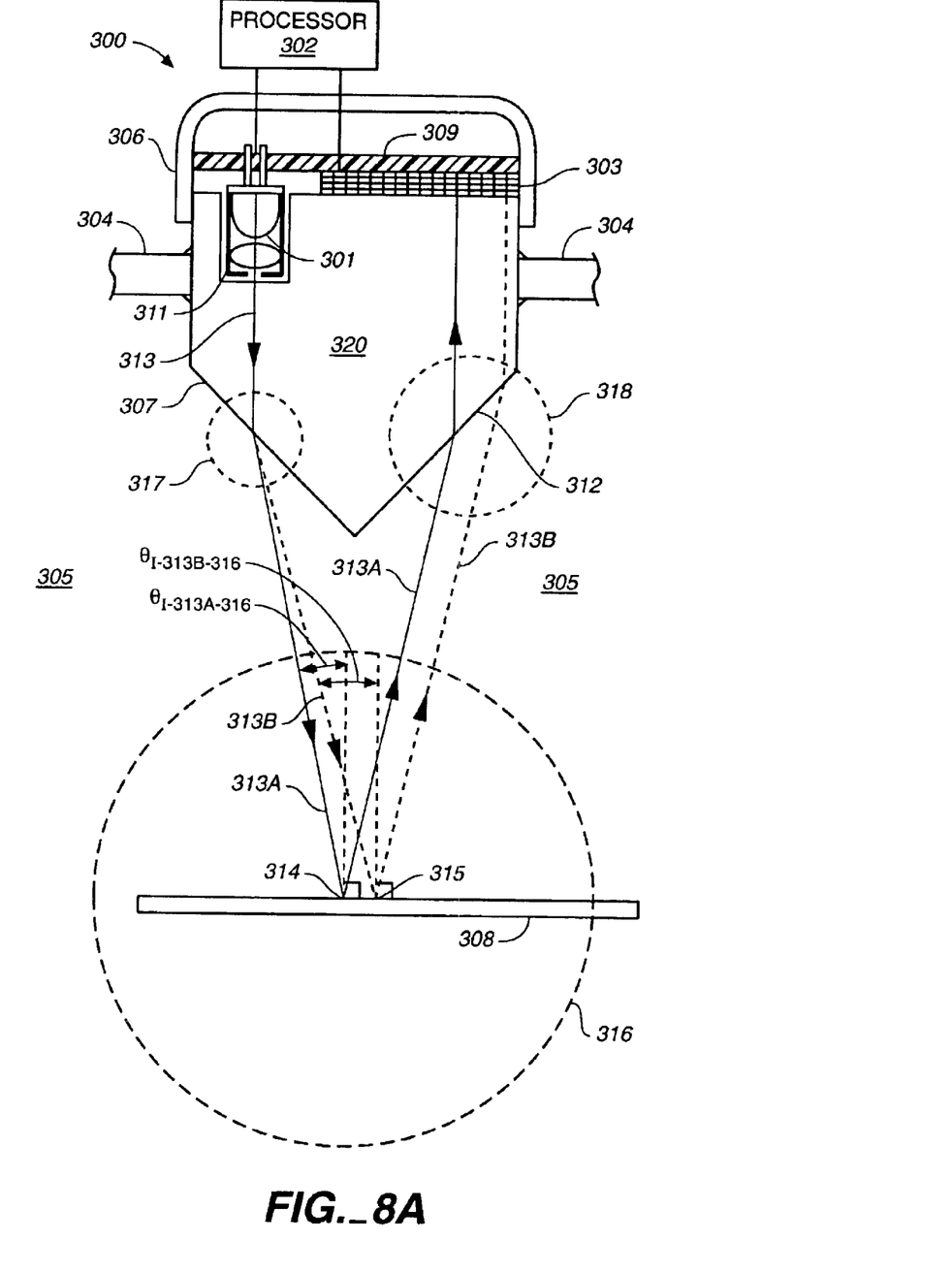
FIG. 8A is a block diagram of a system for evaluating a charge state of a battery in another exemplary embodiment of the invention.

FIG. 7 illustrates reflection of light 213 with electrolyte 205. LED 201 again directionally emits light 213 through optical medium 220 towards refractive interface 207. However, in this embodiment, the battery is discharged thereby making the electrolyte 205 less dense and decreasing the index of refraction $n_1$ from that discussed in FIG. 6. Here, the index of refraction $n_1$ allows reflection of light 213 off interface 207 at an angle $?_1'$, where angle $?_1'$ is angle substantially equal to the incident angle $?_1$ to interface 207.

Once light 213 is reflected off interface 207, light 213 impinges mirrored surface 208 at an angle $?_2$ incident to the mirrored surface with respect to normal 210. Accordingly, light 213 is reflected off mirrored surface at an $?_2'$ that is substantially equal to angle $?_2$. Light 213 is thus reflected towards optical sensor 203 where it is accordingly determined that the battery is fully discharged because light 213 did not refract. As seen from FIGS. 6 and 7, system 200 may determine the charge state of the battery based on the specific gravity and the index of refraction for electrolyte 205 because optical sensor 203 either detects light 213 or it does not, respectively corresponding to either fully charged or fully discharged battery charge states.

The embodiment shown in system 200 of FIG. 7 illustrates one manner in which light may be refracted or reflected based on the positioning of mirrored surfaces and refractive interfaces. However, the invention is not intended to be limited to the number of mirrored surfaces and/or refractive interfaces shown in the exemplary embodiment. For example, other embodiments may comprise a single refractive interface and multiple mirrored surfaces to direct the light to an optical sensor in any manner determined as a matter of design choice.

Figure 8B:
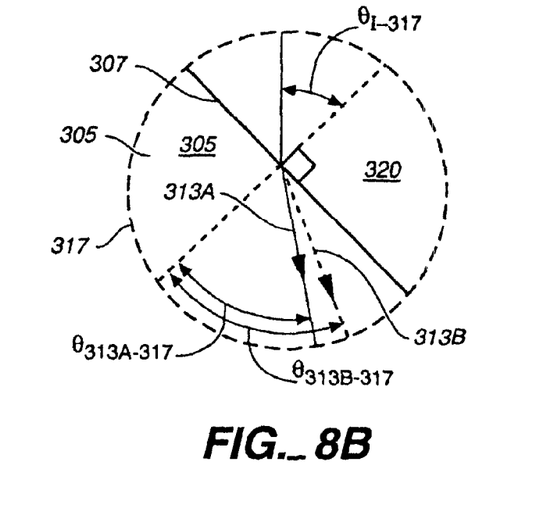
FIGS. 8B and 8C provide additional details of aspects depicted in FIG. 8A.
Figure 8C:
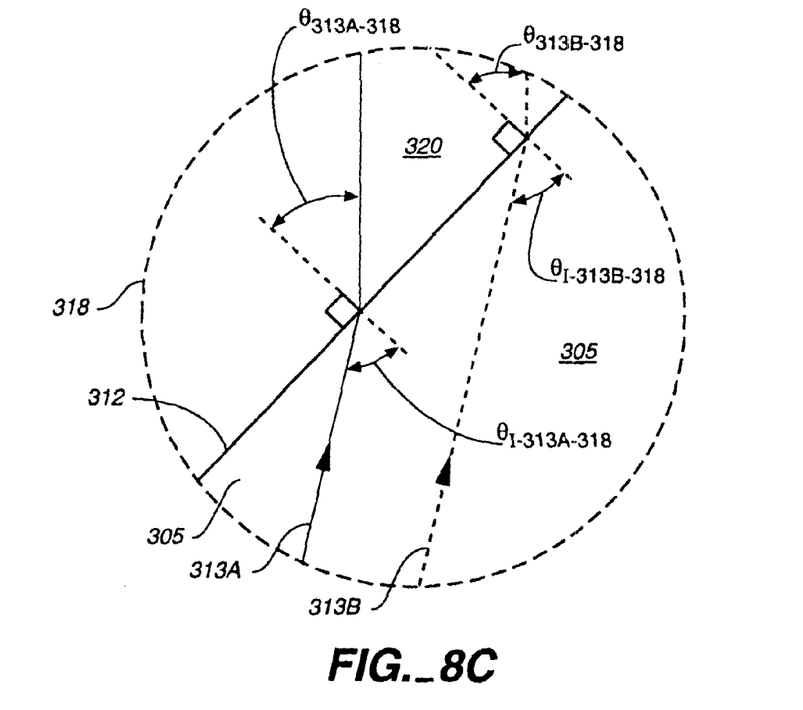

Other embodiments, such as that discussed in FIG. 8A, may comprise other types of sensors such that various indices of refraction can be detected and associated charge states of the battery can be determined. FIG. 8A illustrates a system 300 for evaluating a charge state of a battery (not shown) containing electrolyte 305 in another exemplary embodiment of the invention. FIG. 8A exemplifies overall optical properties of system 300 while FIGS. 8B and 8C provide more detail of particular optical properties of system 300 referenced in FIG. 8A. For example, FIG. 8A illustrates two exemplary angles of refraction in light 313A and 313B corresponding to two specific gravities of electrolyte 305, and thus two unique charge states of the battery. Details of the optical properties at interface 307 and 312 of system 300 are provided in FIGS. 8B and 8C, respectively. Those skilled in the art will recognize that other angles of refraction corresponding to other specific gravities/charge states are within the scope of this invention.

System 300 includes a light emitting means 301 and/or light directing means 311 for transmitting light 313 through optical medium 320 toward refractive interface 307 (thereby refracted a first time) and onto mirrored surface 308. Mirrored surface 308 may be configured for reflecting incident light 313 to refractive interface 312 of optical medium 320. System 300 also includes optical sensor 303 configured for receiving light 313 as the light is further refracted through refractive interface 312. Optical sensor 303, coupled to circuit board 309, may be a CCD externally powered and configured for receiving light 313 at a particular location of the CCD. Such CCD devices and their usage are generally known to those skilled in the art.

Light 313 is refracted at differing angles depending upon the specific gravity of electrolyte 305 through which it is directed relative to the fixed index of refraction of optical medium 320. FIG. 3 shows two exemplary paths of the light—namely 313A and 313B. The paths differ in angular proportion to the difference in refractive properties of the electrolyte 305 and hence in proportion to the charge state of the associated battery. Information regarding the particular location where light 313A/313B impinges optical sensor 303 may be used to determine the amount of refraction caused by electrolyte 305. As such, system 300 may include processor 302 coupled to optical sensor 303 for determining these light-impinging locations. Accuracy of refraction determinations by processor 303 may depend on the resolution of optical sensor 303. For example, a higher resolution CCD can improve location information because light 313A/313B can be detected with greater sensitivity to location on the CCD device. In one embodiment, processor 302 may include an analog to digital converter that converts the location information from optical sensor 303 into digital data for use by processor 302 to determine the refraction based on ascertained locations of the impinging light 313A/313B. In another embodiment, direct digital information may be derived from a CCD optical sensor 303 to determine location of the refracted/reflected light 313. FIG. 8B illustrates detailed views 316, 317 and 318. These views show changes in refraction of light 313 as caused by changes in indices of refraction between mediums (i.e., between refractive interface 307/312 of optical medium 320 and electrolyte 305). In view 317, light 313 is shown traveling through optical medium 320 toward refractive interface 307 and into electrolyte 305. As light 313 passes into electrolyte 305, light 313 is refracted (illustrated by light 313A and 313B). Light 313 impinges the surface between interface 307 and electrolyte 305 at an incident angle $?_{1\text{-}317}$ and refracts according to equation Eq. 1 at angles $?_{313A\text{-}317}$ and $?_{313B\text{-}317}$ for light 313A and 313B, respectively. As shown, each of light 313A and 313B illustratively corresponds to a particular specific gravity of electrolyte 305 and, thus, a particular charge state for the battery.

In view 316, light 313A/313B is shown impinging mirrored surface 308 at points 314 and 315 having respective incidental angles $?_{1\text{-}313A\text{-}317}$ and $?_{1\text{-}313B\text{-}317}$. Mirrored surface 308 reflects light 313A/313B through electrolyte 305 towards optical sensor 303 at angles having the same magnitude from normal as angles $?_{1\text{-}313A\text{-}317}$ and $?_{1\text{-}313B\text{-}317}$. Consequently, in view 318, light 313A/313B is shown impinging the surface between electrolyte 305 and refractive interface 312 of optical medium 320 at incidental angles $?_{1\text{-}313A\text{-}318}$ and $?_{1\text{-}313B\text{-}318}$. Refractive interface 312 is the site of a second refraction of light 313A/313B at angles $?_{313A\text{-}318}$ and $?_{313B\text{-}318}$. This refracted light 313A/313B travels through optical medium 320 towards optical sensor 303 where it impinges the sensor at a particular location. Once the location where light impinges optical sensor 303 is ascertained, processor 302 can determine the index of refraction according to equation Eq. 1 with respect to known values of indices of refraction for fully charged and fully discharged battery containing electrolyte 305, as similarly discussed above.

In one embodiment of the invention, system 300 includes shroud 306 configured for preventing undesired light from traveling through optical interface 307/312. In another embodiment of the invention, system 300 includes brackets 304 for attaching system 300 within walls of the battery. Brackets 304 may be hermetically sealed to prevent corrosion of the brackets by electrolyte 305.

Figure 9:
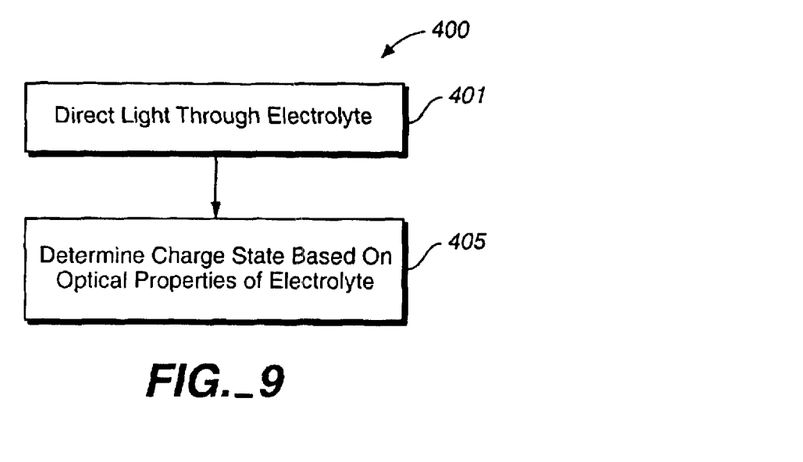
FIG. 9 is a flowchart of steps performed by a system for evaluating a charge state of a battery in an exemplary embodiment of the invention.

FIG. 9 illustrates a flowchart 400 of steps performed by a system for evaluating a charge state of a battery in an exemplary embodiment of the invention. Light is directed through an electrolyte, in step 401. The electrolyte in this embodiment is translucent and refracts light according to a specific gravity of the electrolyte. Once light is directed through the electrolyte, a determination of the charge state for the battery may be made from optical properties of the electrolyte, in step 405. For example, when using an optical sensor essentially comprising two states, the optical sensor may receive light indicating one particular charge state of the battery, such as fully discharged. Alternatively, where the optical sensor does not receive the light, the optical sensor may determine a fully charged state. Other examples may include determinations of charge state with respect to other optical properties of the light traveling through the electrolyte, such as frequency of the light and/or phase of the light.

Figure 10:
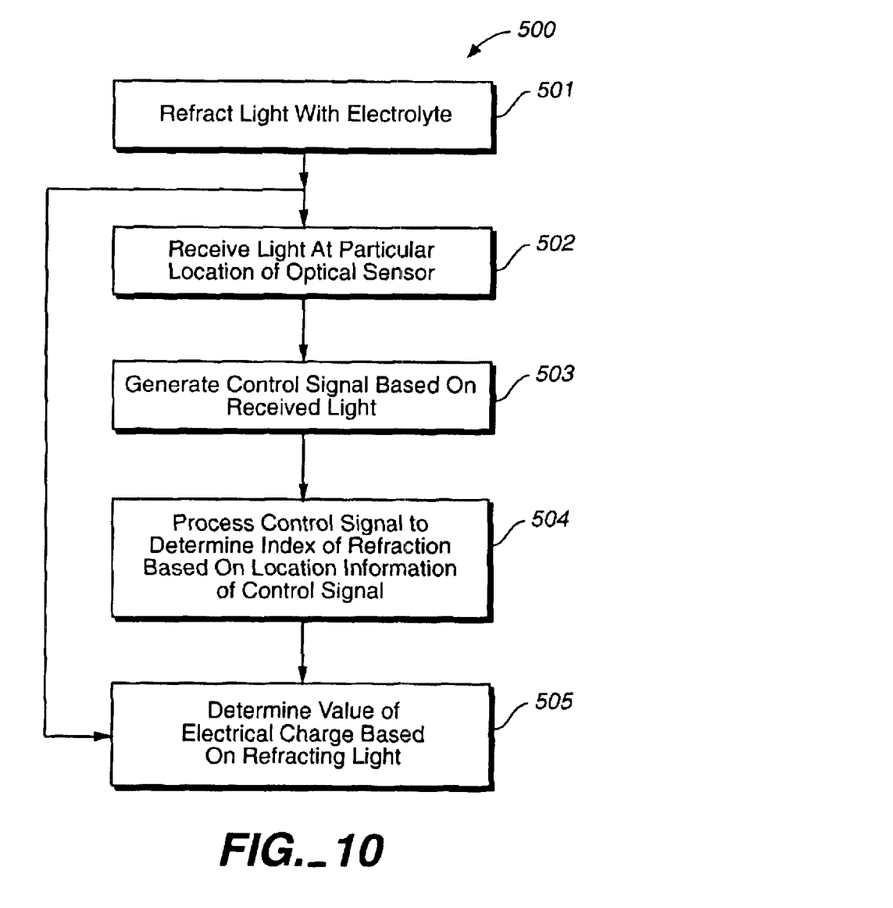
FIG. 10 is a flowchart of steps performed by a system for evaluating a charge state of a battery in another exemplary embodiment of the invention.

FIG. 10 illustrates a flowchart 500 of steps performed by a system for evaluating a charge state of a battery in another exemplary embodiment of the invention. Light is refracted through an electrolyte, in step 501. The light is received by an optical sensor, such as optical sensor 303 of FIG. 8, at a particular location based, in part, on the index of refraction of the electrolyte, in step 502. The optical sensor may generate a control signal based on the received light, in step 503. A processor, such as processor 302 of FIG. 8, processes the control signal to determine the index of refraction for the electrolyte based on a particular location where light impinges the optical sensor, in step 504. The processor then determines the charge state based on the refracting light, in step 505. For example, the processor may determine the specific gravity for the electrolyte based on a determined index of refraction for the electrolyte. From that determined specific gravity, the processor can determine the charge state of the battery based on known tables of material properties, such as those described herein.

Advantages of the above mentioned embodiments include an improved charge state determinations of battery that are substantially instantaneous and do not physically intrude upon the electrolyte under analysis.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system for evaluating a charge state of a battery, comprising:
   a light source configured for emitting light through an electrolyte within the battery; and
   an optical element configured for determining the charge state based on the light passing through the electrolyte wherein the optical element comprises a charge coupled device adapted for indicating a position of light impinging on the charge coupled device and wherein the optical element further comprises a processor configured for determining the charge state based on the particular position of the light impinging the charge coupled device.

2. The system of claim 1, wherein the electrolyte is at least one of a liquid and a gel.

3. The system of claim 2, wherein the liquid comprises sulfuric acid.

4. The system of claim 1, wherein the electrolyte is encapsulated within cells of the battery and wherein the battery is a lead-acid battery.

5. The system of claim 1, further comprising an optical barrier configured for preventing the light from directly traveling from the light source to the optical element.

6. The system of claim 1, wherein the light source comprises a light emitting diode.

7. The system of claim 1, wherein the light source comprises a shutter configured for discretely emitting the light from the light source.

8. The system of claim 1, further comprising a processor configured for determining the charge state based on a specific gravity of the electrolyte and an index of refraction of the electrolyte.

9. The system of claim 8, wherein the processor is further configured for generating a least mean squares approximation of the index of refraction with respect to the specific gravity.

10. The system of claim 1, further comprising a mirrored surface configured for reflecting the light to the optical element based on a pre-determined evaluation of the index of refraction of the electrolyte, wherein reflected light is used to determine the charge state.

11. A system for evaluating a charge state of a battery, comprising:
   a light source; and
   a charge detector in communication with the light source and configured for determining the charge state in real-time wherein the charge detector comprises a charge coupled device capable of indicating multiple positions of light impinging on the charge coupled device and wherein the charge detector further comprises a processor configured for determining the charge state based on the particular location of the light impinging the charge coupled device.

12. The system of claim 11, wherein the battery comprises an electrolyte that is at least one of a liquid and a gel.

13. The system of claim 11, wherein the light source comprises a light emitting diode.

14. The system of claim 11, wherein the light source comprises a shutter configured for discretely emitting the light from the light source.

15. A method of evaluating a charge state of a battery, comprising steps of:
   directing light through an electrolyte within the battery; and
   determining a value of the charge state based on the light passing through the electrolyte wherein the step of determining comprises receiving the light on a charge coupled device capable of indicating multiple positions of light impinging on the charge coupled device and wherein the step of determining further comprises determining the charge state based on the particular location of the light impinging the charge coupled device.

16. The method of claim 15, wherein the step of directing comprise a step of emitting the light.

17. The method of claim 15, wherein the step of directing comprise a step of shuttering the light.

18. The method of claim 17, wherein the step of determining further comprises a step of determining the value of the charge state based on the index of refraction of the electrolyte and an associated a specific gravity of the electrolyte.

* * * * *